Oct. 3, 1967  KUNIO HONMA  3,345,188
CERAMIC DIELECTRICS
Filed May 12, 1964  4 Sheets-Sheet 1
Fig-1-
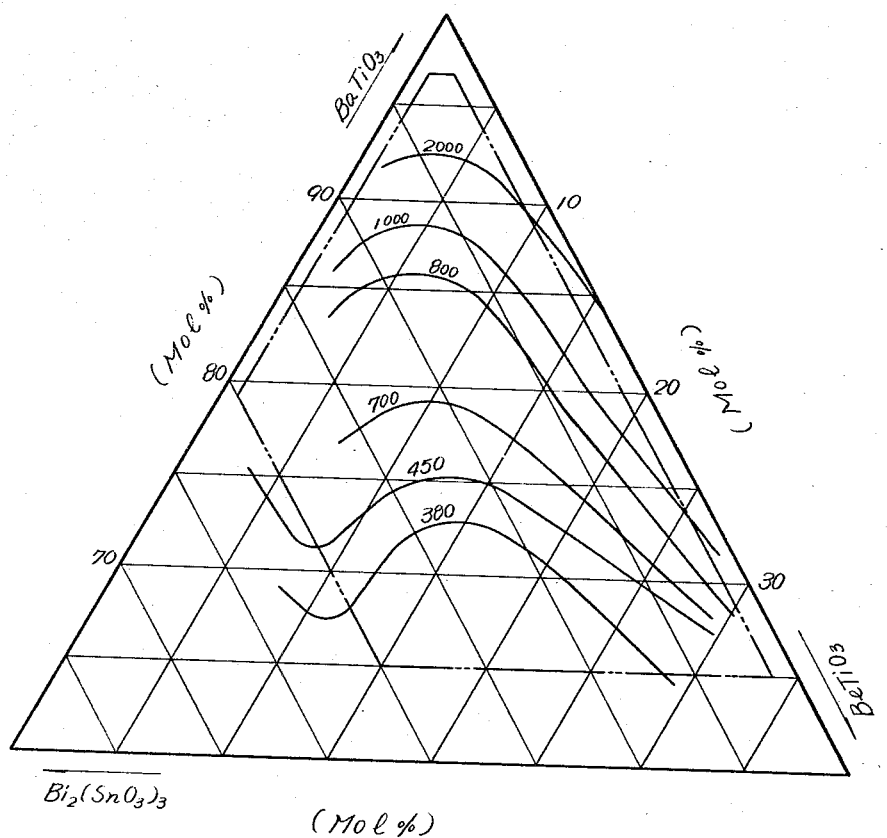
Kunio Honma
INVENTOR.
BY Wenderoth,
Lind and Ponack, attorneys Oct. 3, 1967 KUNIO HONMA 3,345,188
CERAMIC DIELECTRICS
Filed May 12, 1964 4 Sheets-Sheet 2
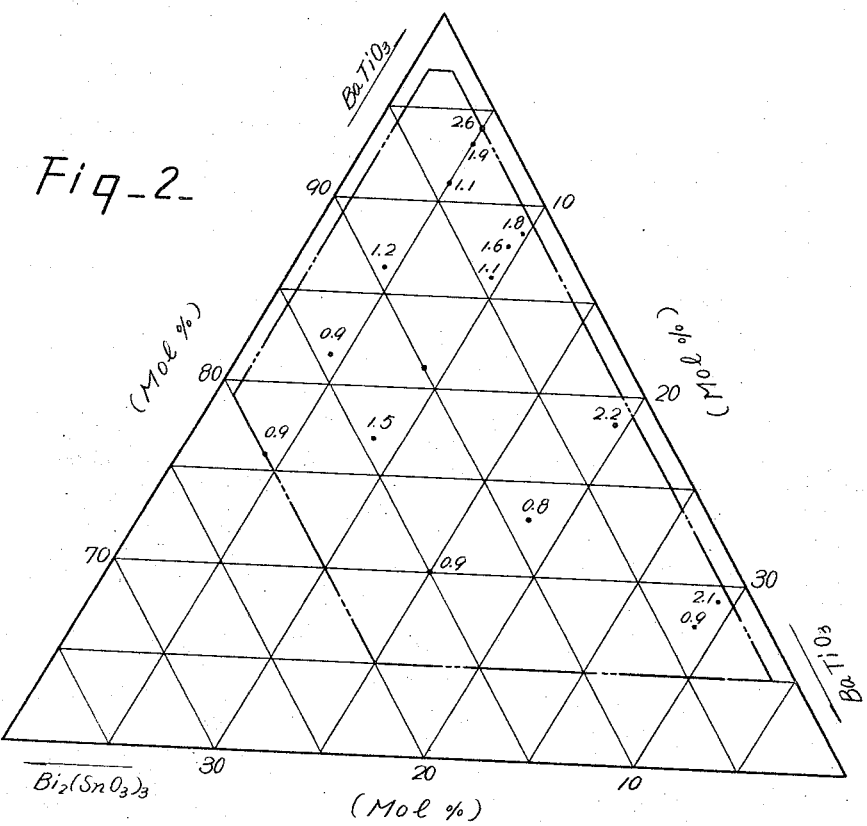
Fig-2-
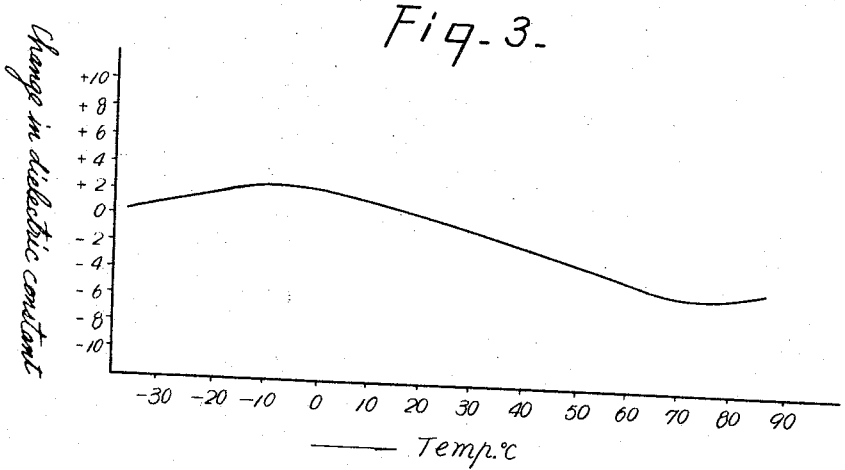
Fig-3-
Kunio Honma
INVENTOR.
BY Wenderoth,
Lind and Ponack,
attorneys

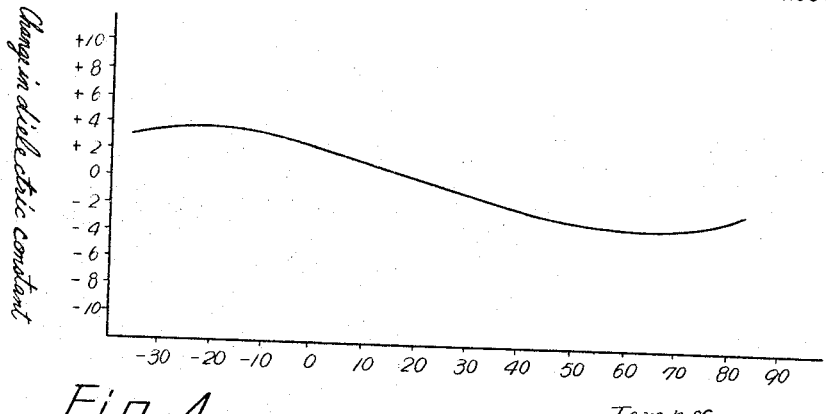
Fig-4-
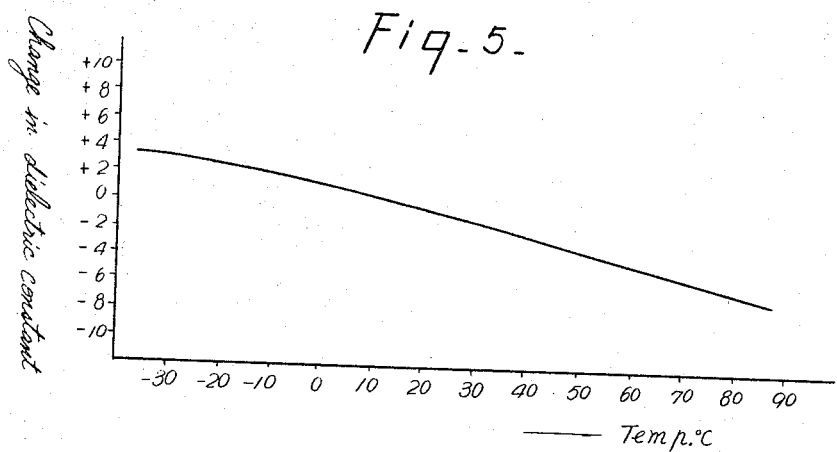
Fig-5-
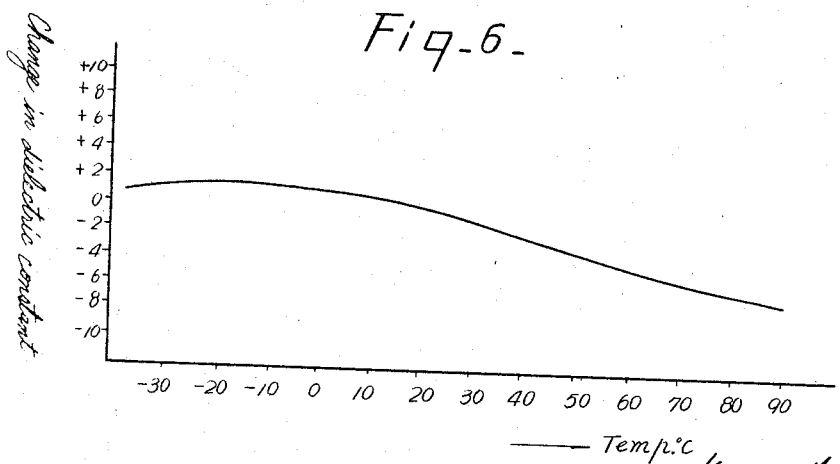
Fig-6-

Oct. 3, 1967
KUNIO HONMA
3,345,188
CERAMIC DIELECTRICS
Filed May 12, 1964
4 Sheets-Sheet 4
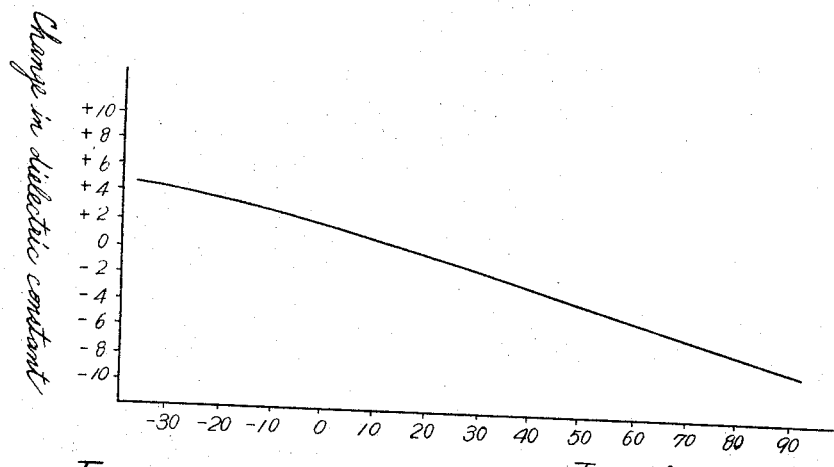
Fig_7_
Fig_8_
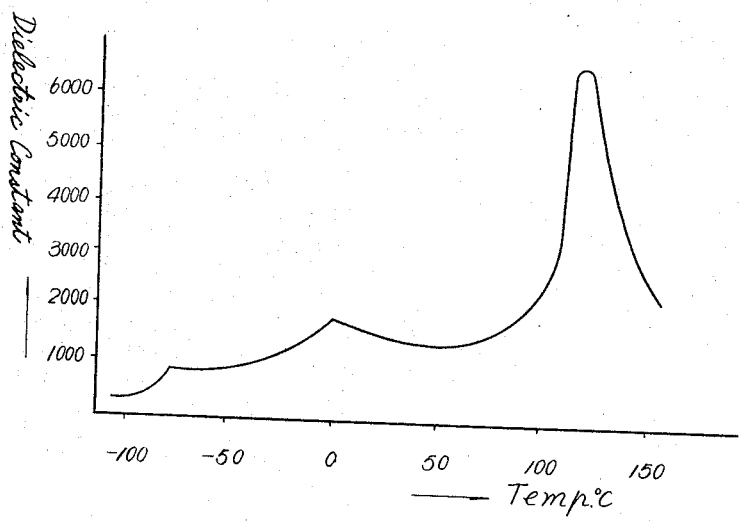

3,345,188
CERAMIC DIELECTRICS
Kunio Honma, Honjyo-shi, Akita-ken, Japan, assignor to TDK Electronics Co., Ltd., Tokyo, Japan
Filed May 12, 1964, Ser. No. 366,857
Claims priority, application Japan, May 18, 1963, 38/26,019
1 Claim. (Cl. 106—39)

ABSTRACT OF THE DISCLOSURE

Ceramic dielectrics are provided which possess a high value of dielectric constant and a low dielectric loss. The dielectrics consist essentially of (a) $BaTiO_3$ in an amount of about 65 to 97.5 molar percent,
(b) $BeTiO_3$ in an amount of about 1 to 34 molar percent, and
(c) $Bi_2(SnO_3)_3$ in an amount of about 1 to 20 molar percent.

The dielectrics are prepared by admixing $BaTiO_3$, $BeTiO_3$, $Bi_2O_3$, $SnO_2$, and mineralizer such as $La_2O_3$, molding the admixture to the desired shape and sintering to form the ceramic dielectric.

Specification

This invention relates to ceramic dielectrics which possess high values of dielectric constant, low dielectric loss and excellent temperature characteristics.

The object of the present invention is to provide ceramic dielectric bodies, especially for condenser use, having surpassing characteristics, such as high values of dielectric constant, very low dielectric loss and excellent temperature characteristics.

In general, dielectric bodies for condenser use must satisfy such conditions as first, that the dielectric bodies have high values of dielectric constant and low values of dielectric loss, second, that the said bodies are stable to variation of temperature and third, that the said bodies have high withstanding voltage and high electrical insulating resistance.

Because of the fact that in the Curie point region, adjacent 120° C. (refer to FIG. 8 of accompanying drawings), the dielectric constant of barium titanate ceramics rises sharply to a very high peak, these ceramics can not be used in many applications where good stability is required.

Many attempts have been made to improve such temperature characteristics of dielectric constants. For instances, the addition of barium zirconate and/or strontium titanate to barium titanate results in shifting the Curie point to relatively lower temperature, and the addition of calcium and/or magnesium titanate to barium titanate results in minimizing change in dielectric constant with reference to 25° C. Such improvements, however, are not enough to smooth the temperature coefficient curve of the dielectric constant, and moreover, as a result of the increases of the dielectric loss and the decreases of the dielectric constant, the practical application of such dielectrics is highly limited.

The characteristic feature of invention is to provide the ceramic dielectric material, which comprise barium titanate ($BaTiO_3$), beryllium titanate ($BeTiO_3$) and bismuth stannate ($Bi_2(SnO_3)_3$), having excellent temperature characteristic and low dielectric loss and so, of course, high dielectric constant.

According to this invention, to obtain ceramic dielectrics, having excellent electrical properties, it is required that the proportion of the three components, barium titanate ($BaTiO_3$), beryllium titanate ($BeTiO_3$) and bismuth stannate ($Bi_2(SnO_3)_3$), be limited as follows:

| | Molar percentage |
|---|---|
| $BaTiO_3$ | 65–97.5 |
| $BeTiO_3$ | 1–34 |
| $Bi_2(SnO_3)_3$ | 1–20 |

The reasons for the foregoing limitations are as follows: When the proportion of barium titanate ($BaTiO_3$) is below 65 molar percent, the dielectric constant ($\epsilon$) becomes smaller than 350 and the change in dielectric constant is more than ±10 percent and when the proportion of barium titanate ($BaTiO_3$) exceeds 97.5 molar percent, the change in dielectric constant ($\epsilon$) also is more than ±10%. And when the proportion of beryllium titanate ($BeTiO_3$) is below 1 molar percent, the effect of improvement on temperature characteristic of the dielectric constant ($\epsilon$) by addition of beryllium oxide (BeO) is not apparent and when the proportion of beryllium oxide (BeO) exceeds 34 molar percent, the results are small dielectric constant ($\epsilon$) and difficulties in vitrification because of the limitation of final sintering temperature ranging within 1120±5° C.

Furthermore, when the proportion of bismuth stannate ($Bi_2(SnO_3)_3$) is below 1 molar percent, the temperature characteristic of the dielectric constant ($\epsilon$) is so poor as to become more than ±10%, and the dielectric loss tan $\delta$ becomes larger. When the proportion of the said bismuth stannate ($Bi_2(SnO_3)_3$) exceeds 20 molar percent, the dielectric constant ($\epsilon$) is so small as to have a value of 350 and so the usefulness is impaired.

In accompanying drawings FIG. 1 is a triangular graph showing the relation between the composition and the dielectric constant of the dielectric body of this invention.

FIG. 2 is a triangular graph showing the relation between the composition and the dielectric loss of the said ceramic body of the invention.

FIGS. 3 to 7 represent change in dielectric constant with reference to 25° C. These figures correspond to the specimens, No. 3, 7, 11, 12 and 14, in the examples of this disclosure respectively.

FIG. 8 shows the relation between temperature and dielectric constant of the barium titanate ceramic materials which have been used.

Example

Into raw material of barium titanate, which is prepared by mixing of equimolar amounts of barium carbonate ($BaCo_3$) and titanium (IV) oxide ($TiO_2$) and firing at the temperature of 1280° C., at which the structure of barium titanate is not yet perfectly completed, with raw material of beryllium titanate ($BeTiO_3$), which is prepared by mixing of equimolar amounts of beryllium (II) oxide (BeO) and titanium (IV) oxide ($TiO_2$) and firing at the temperature of 1150° C., at which perfect beryllium titanate structure is not completed, bismuth (III) oxide and tin (IV) oxide ($SnO_2$) are added. Then a minor quantity of suitable mineralizer, such as lanthanum (III) oxide ($La_2O_3$) is added into above mixture. This mixture is molded and sintered to ceramic body form.

The relations between the composition and the dielectric constant, ($\epsilon$), and the dielectric loss, tan $\delta$ (percent), are given by triangular graphs in FIGS. 1 and 2.

The characteristics of the dielectric bodies of this invention are summarized in the following table. In this table, the electrical insulation resistance, I.R., is represented by the period (sec.), that is required for the specimen to reach $10^5$ M $\Omega$ under 500 v. The measurements have been all carried out at a frequency of 1 kc.

TABLE

| Specimen No. | Composition molar percent | | | Mineralizer $La_2O_3$, Weight Percent | $\epsilon$ tan $\delta$, IR at room temperature | | | Change in dielectric constant $\epsilon$ (−30°+85° C.) | | | | Final sintering temperature, ° C. |
|---|---|---|---|---|---|---|---|---|---|---|---|---|
| | | | | | | | | Maximum in positive | | Maximum in negative | | |
| | $BaTiO_3$ | $BeTiO_3$ | $Bi_2(SnO_3)_3$ | | $\epsilon$ | Tan $\delta$ (percent) | IR | Percent | ° C. | Percent | ° C. | |
| 1 | 94.0 | 5.0 | 1.0 | 0.2 | 2,172 | 3.07 | 9.7–12.0 | 9.7 | 85 | −9.5 | −30 | 1,220 |
| 2 | 93.7 | 4.9 | 1.4 | 0.2 | 2,123 | 2.62 | 9.7–14.5 | 7.0 | 85 | −6.6 | −30 | 1,220 |
| 3 | 93.4 | 4.9 | 1.7 | 0.2 | 2,116 | 1.88 | 7.5–10.4 | 2.6 | 0 | −4.3 | 75 | 1,240 |
| 4 | 88.5 | 9.8 | 1.7 | 0.2 | 2,090 | 1.82 | 7.5–8.0 | 4.4 | −2 | −4.2 | 60 | 1,240 |
| 5 | 88.3 | 9.8 | 1.9 | 0.2 | 1,800 | 2.00 | 6.9–8.8 | 6.7 | −30 | −1.6 | 55 | 1,220 |
| 6 | 87.7 | 9.7 | 2.6 | 0.2 | 1,225 | 1.55 | 4.3–5.6 | 8.1 | −30 | −5.7 | 85 | 1,220 |
| 7 | 78.4 | 19.6 | 2.0 | 0.2 | 892 | 2.18 | 2.0–3.0 | 4.0 | −10 | −2.8 | 60 | 1,240 |
| 8 | 69.0 | 29.5 | 1.5 | 0.2 | 983 | 2.08 | 4.5–5.5 | 6.1 | −20 | −9.5 | 85 | 1,260 |
| 9 | 91.0 | 4.8 | 4.2 | 0.2 | 1,100 | 1.1 | 2.8–3.1 | 5.1 | −30 | −7.6 | 85 | 1,140 |
| 10 | 86.1 | 9.6 | 4.3 | 0.2 | 935 | 1.1 | 2.5–2.8 | 5.3 | −30 | −7.3 | 85 | 1,140 |
| 11 | 67.5 | 28.9 | 3.6 | 0.2 | 408 | 0.95 | 2.2–2.5 | 3.8 | −30 | −6.0 | 85 | 1,130 |
| 12 | 85.9 | 4.5 | 9.6 | 0.2 | 886 | 1.2 | 2.2–2.5 | 1.7 | −13 | −5.7 | 85 | 1,130 |
| 13 | 81.1 | 9.0 | 9.9 | 0.2 | 750 | 1.1 | 2.4–2.9 | 2.8 | −20 | −5.7 | 85 | 1,150 |
| 14 | 73.0 | 18.2 | 8.8 | 0.2 | 385 | 0.8 | 2.0–2.4 | 4.2 | −30 | −7.2 | 85 | 1,140 |
| 15 | 81.6 | 4.3 | 14.1 | 0.2 | 597 | 0.9 | 2.2–2.6 | 4.3 | −30 | −7.6 | 85 | 1,120 |
| 16 | 76.9 | 8.5 | 14.6 | 0.2 | 705 | 1.5 | 2.6–2.8 | 1.1 | −10 | −4.5 | 85 | 1,120 |
| 17 | 76.2 | 4.0 | 19.8 | 0.2 | 440 | 0.9 | 2.2–2.2 | 3.7 | −30 | −8.1 | 85 | 1,160 |

As disclosed clearly in the above table and FIGS. 1 and 2, the ceramic dielectric bodies in according with this invention have high values of dielectric constant and low values of dielectric loss. Moreover, as the favorable temperature characteristics make the bodies very stable to temperature change, it becomes possible to provide small-sized ceramic condensers having extremely low strain inductance.

It is clear from the column relating to ($\epsilon$) of the above table and FIGS. 3 to 7 that the stability of the dielectric constant to temperature is very excellent.

FIGS. 3 to 7 are graphs showing relation between temperature and change in dielectric constant ($\epsilon$) with reference to 25° C., for the Specimens Nos. 3, 7, 11, 12 and 14, in the table.

What is claimed is:
A ceramic dielectric consisting essentially of

(a) $BaTiO_3$ in an amount of about 65 to 97.5 molar percent,
(b) $BeTiO_3$ in an amount of about 1 to 34 molar percent,
(c) $Bi_2(SnO_3)_3$ in an amount of about 1 to 20 molar percent, and
(d) $La_2O_3$ in an amount of about 0.2 molar percent.

References Cited

UNITED STATES PATENTS 2,658,833 11/1953 Coffeen et al. _____ 106—39
2,908,579 10/1959 Nelson et al. _____ 106—39

FOREIGN PATENTS 532,780 11/1956 Canada.
574,577 1/1946 Great Britain.

HELEN M. McCARTHY, *Primary Examiner.*